United States Patent [19]

Fredriksen et al.

[11] Patent Number: 4,662,004
[45] Date of Patent: Apr. 28, 1987

[54] LASER COMMUNICATION SYSTEM

[75] Inventors: Herbert A. Fredriksen, Mountville; Richard K. Walter, Manheim; Ronald B. Mentzer, Lancaster, all of Pa.

[73] Assignee: FMW Corporation, Lancaster, Pa.

[21] Appl. No.: 682,084

[22] Filed: Dec. 17, 1984

[51] Int. Cl.$^4$ .............................................. H04B 9/00
[52] U.S. Cl. .................................. 455/607; 455/613; 455/618
[58] Field of Search .............. 455/601, 606, 607, 612, 455/617, 618, 610, 613

[56] References Cited

U.S. PATENT DOCUMENTS

| | | | |
|---|---|---|---|
| 1,984,673 | 12/1934 | DuMont | 455/617 |
| 2,404,696 | 7/1946 | Deal | 455/607 |
| 3,614,447 | 10/1971 | Ripper | 455/613 |
| 3,617,750 | 11/1971 | Walker | 455/617 |
| 3,657,543 | 4/1972 | Rose | 329/144 |
| 3,828,185 | 8/1974 | Vandling | 455/605 |
| 4,107,519 | 8/1978 | Bicek | 455/617 |
| 4,307,469 | 12/1981 | Casper et al. | 455/613 |
| 4,553,268 | 11/1985 | Tilly | 455/612 |

FOREIGN PATENT DOCUMENTS

| | | | |
|---|---|---|---|
| 52-35905 | 3/1977 | Japan | 455/607 |
| 56-87948 | 7/1981 | Japan | 455/606 |

OTHER PUBLICATIONS

Bock—The KCA 100—Intern. Broadcast Engineer—vol. 10, #167, Sep. 1979, pp. 18-20, 22, 55.
Osterfield et al—"An Optical Fibre Link"—Conf. Cherry Hill, N.J., Procedings of the Intern. Wire & Cable Symposium, 18-20, Nov. 1980, pp. 202-211.

Primary Examiner—Joseph A. Orsino, Jr.
Attorney, Agent, or Firm—Martin Fruitman

[57] ABSTRACT

An atmospheric optical communications link which compensates for variations caused by changes in the atmospheric transmission medium. The signal carrying light link includes a separate control laser at the receiver which communicates back to the primary transmitter to control it so that the primary beam light intensity is adjusted to compensate for atmospheric conditions. The reverse laser system is also used to remotely operate the control system at the transmitter and for other communication from the receiver station to the transmitter station.

3 Claims, 1 Drawing Figure

U.S. Patent   Apr. 28, 1987   4,662,004
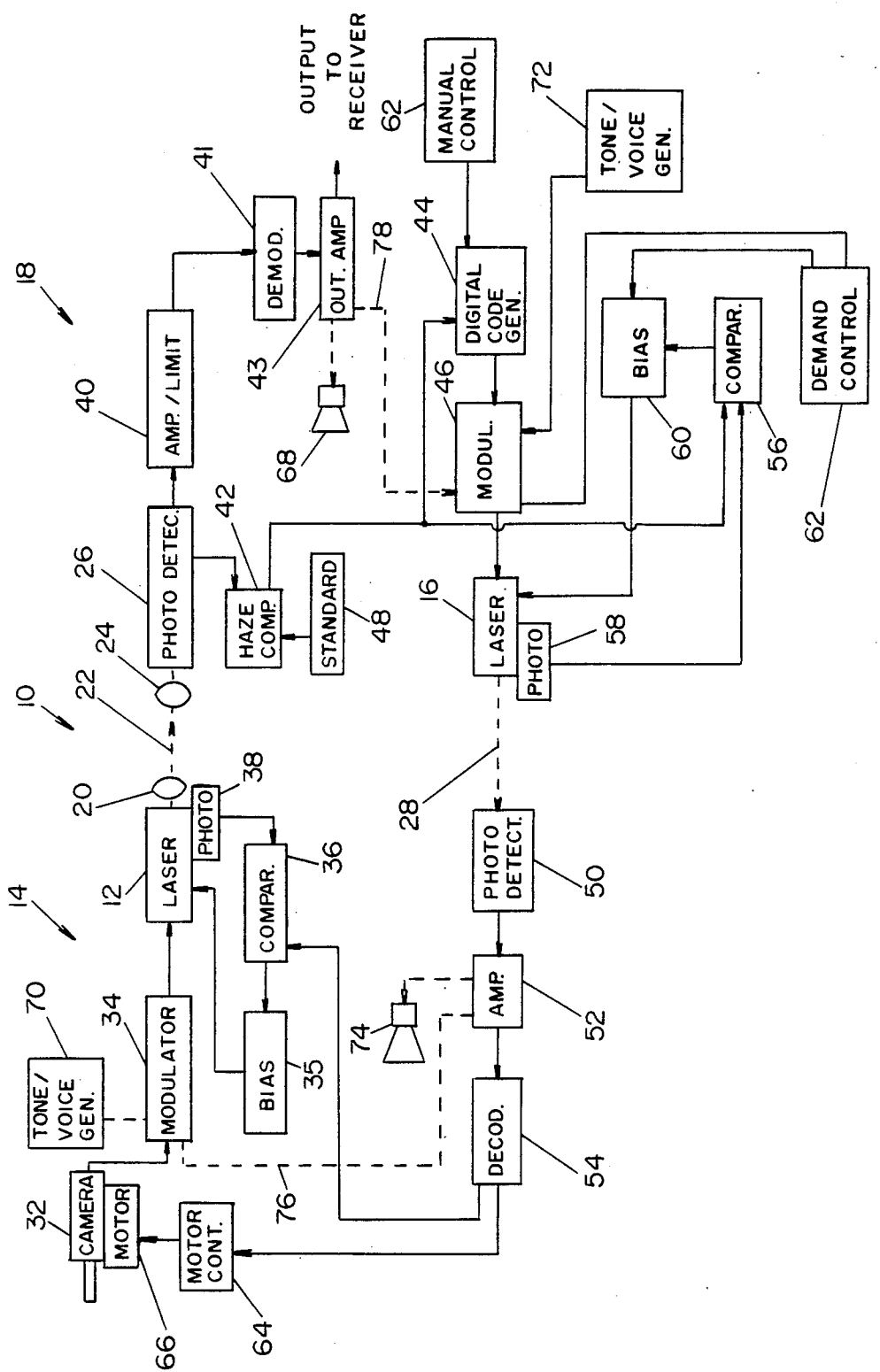

LASER COMMUNICATION SYSTEM

SUMMARY OF THE INVENTION

This invention deals generally with telecommunications and more specifically with light wave communication systems in which the transmitter and receiver are at separate locations.

While numerous systems exist for transmission of information by laser beams, they all experience a common problem in that optical communication through the atmosphere is subject to the vagrancies of the atmosphere itself, the medium through which the light beam passes. The lack of utilization of such laser communication systems may, in fact, be due to the concern over reliability of communication when signal amplitude can be dramatically affected by haze, rain or smoke.

While there have been some efforts to overcome this limitation, they have fallen short of being practical, reliable systems because they have depended largely upon reflection of the beam from the receiver or monitoring of background radiation.

The present invention attacks the basic problem of atmospheric variations in a new manner, by using a completely independent laser source to communicate information about those changes in the received primary beam caused by atmospheric effects.

The primary transmission is typically a laser transmission of a television signal. In the preferred embodiment a T.V. signal of about one volt peak to peak, the same magnitude which is typically fed into a receiver by a closed circuit T.V. system, is the input signal level. The one volt peak to peak video signal amplitude variation, frequency modulates a 4 MHZ sine wave. The 4 MHZ sine wave pulse width modulates the laser, which, in the preferred embodiment, operates at a nominal 780 nanometers wavelength with an average radiant power of 3-5 milliwatts.

The light beam generated by this video laser is columnated by a lens system that has a divergence of 1 millirad. Beam diameter is 1 meter per kilometer and is effective for distances of up to 5 miles. The location at which the video signal originates is referred to as the "remote".

The "local" unit at the point of reception of the video signal uses a photodiode, which views the laser beam through a converging lens system to convert the light beam to an electrical signal. The photodiode output is amplified, limited, and the varying sine wave frequency is converted to a video amplitude of 1 volt peak to peak which can directly feed a T.V. receiver.

In such a system it becomes apparent that any variation in the light intensity, as, for instance, that caused by haze or rain, has a direct effect on signal strength. The present system, therefore, includes a means to compensate for such atmospheric effects.

To accomplish this, a monitoring circuit constantly evaluates the voltage output of the photodiode and compares it, on an average basis, to a predetermined standard. If the photodiode output is either too low or too high, the circuit furnishes an appropriate signal to a control circuit which controls a secondary laser. The secondary laser transmits a signal back to the transmitter requiring it to increase or decrease the primary laser power, whichever is appropriate.

To save power this secondary laser adjustment signal need not be continuous, and, in the preferred embodiment, is only transmitted once a minute.

The secondary laser is mounted adjacent to the photodiode in order to transmit a light beam back to the video transmitting unit. This control beam is received by another photodiode assembly located adjacent to the video laser.

The control beam impinges upon a photodetector which converts the digital signal to a voltage for evaluation. This voltage contains the same information as was furnished to the secondary laser control circuit and it is used to vary the primary laser power as required to compensate for the change in transmission characteristics of the atmosphere through which the primary laser beam travels.

If, for instance, haze has attenuated the primary laser beam, the laser power is increased to bring the light intensity received by the primary photodiode back up to the standard transmission level.

The system therefore essentially ignores the cause of reduced signal and uses the secondary laser link as a part of a feedback loop which operates based on the voltage output of the primary photodiode that receives the primary laser beam.

The system also includes automatic adjustment for primary laser degradation with use. Most lasers tend to require more bias as they age because the light efficiency degrades slowly with use. The present invention automatically compensates for this factor by recognizing the reduced light output, as seen by an internal monitoring photodiode and increasing the bias on the primary laser accordingly. This bias is the same parameter changed within the control link to compensate for atmospheric variations on a minute to minute basis, so that both haze adjustment and the compensation for laser degradation are automatic.

The secondary laser is modulated by a digital pulse code but operated only on demand, that is when signal is present, in order to extend its useful life.

The secondary laser also adds additional versatility to the system in that all types of control information can be transmitted from the primary receiver to the primary transmitter without the use of outside lines. For instance, activation or deactivation of equipment, scan and focus for the T.V. camera generating the video signal, or changing of programming can be controlled by the secondary laser link, and the once-a-minute limitation has no bearing on such functions. If desireable, voice communication can also be transmitted by the same laser link, but for such purposes a continuous secondary laser link is required.

BRIEF DESCRIPTION OF THE DRAWING

The FIGURE is a simplified block diagram representation showing the electronic components of the preferred embodiment.

DETAILED DESCRIPTION OF THE INVENTION

The FIGURE is a simplified schematic representation of the preferred embodiment of laser communication system 10 showing primary laser 12 at transmitter 14 and secondary laser 16 at receiver 18.

Transmitter lens 20 adds to the inherent columnation of primary laser beam 22, and receiver lens 24 converges primary laser beam 22 onto photodetector 26.

Secondary laser 16 sends its beam 28 in the direction opposite from primary laser beam 22, and it is of no consequence that the beams may occupy the same path simultaneously since the light transmitter and receiver systems are inherently unidirectional.

The FIGURE depicts the basic electronic circuit of the preferred embodiment in block diagram form with arrows indicating direction of signal flow. At transmitter 14 a signal is fed from a conventional R.F. source such as camera 32 and fed into primary laser modulator circuit 34 which operates primary laser 12 to yield pulse width modulation of beam 22 at the frequency of the original input signal. The basic level of the laser amplitude is controlled by a bias circuit 35 which is itself controlled by primary laser comparator 36. Comparator 36 contains a standard reference voltage and comparator means whereby the output of photodetector 38 which monitors the output of laser 36 for age, temperature and other variations is compared to a standard voltage and the bias level changed until differences in the photodetector output and predetermined standard reference voltage are eliminated to maintain a stable predetermined laser output.

At receiver 18 primary laser beam 22 is converged by lens 24 onto photodetector 26 which produces a voltage signal fed to amplifier/limiter 40 which amplifies it and sends it to demodulator 41 and output amplifier 43 for delivery to a conventional R.F. load device, for instance a T.V. receiver (not shown). Photodetector 26 output is also fed to haze comparator 42 which compares the photodetector voltage output to reference standard 48 and feeds a control signal dependent on the amplitude and sense of the difference to digital code generator 44. Digital code generator 44 feeds modulator 46 which operates secondary laser 16 and varys the signal transmitted by it to photodetector 50 so that the transmitter control circuitry increases or decreases the intensity of primary laser 12 according to the requirements of the combined circuits in order to assure that haze monitor 42 sees the proper voltage input, regardless of atmospheric conditions between transmitter 14 and receiver 18.

Control of primary laser 12 is accomplished by the signal from photodetector 50 being fed through amplifier 52 to decoder 54 and then to comparator 36. Comparator 36 then varys bias circuit 35 to increase or decrease the output level of laser 12 as needed to meet the standards of haze comparator 42 back at receiver 18.

This haze control aspect of the present invention also acts based on the assumption that atmospheric haze, fog or rain affecting the primary laser will also affect the secondary laser, and it therefore varys the output of secondary laser 16 as it controls the output of primary laser 12.

This is accomplished by haze comparator 42 also supplying a signal to secondary laser comparator 56 which acts similarly to primary laser comparator 36. Secondary laser comparator 56 receives one input from photodetector 58 which monitors the output of secondary laser 16. Comparator 56 compares the signal from photodetector 58 to an internal preset standard and, by means of bias circuit 60 increases or decreases the output level of secondary laser 16 accordingly. This action inherently accomodates the laser 16 output to age, temperature and other such internal circuit factors. However, haze comparator 42 also feeds its signal to comparator 56 and therefore varys the output level of secondary laser 16 based on the atmospheric conditions which required changes in the output of primary laser 12.

Secondary laser 16 also uses a duty factor reduction circuit to increase its useful life. To accomplish this, demand control circuit 62 monitors the output of modulator 46 and activates bias circuit 60, which turns on laser 16, only when signal is available for transmission to transmitter 14. This dramatically reduces the "on" time of secondary laser 16 since control information is actually transmitted relatively infrequently in most systems. Reducing time on, of course, increases the useful life of the laser.

Compensation for atmospheric conditions is only one of many control functions which can be accomplished by secondary laser 16. In the preferred embodiment it is also used to control T.V. camera 32 which generates the primary signal, and it also is used to aid in the initial alignment of the optics of the system.

To better understand the value of this aspect, a typical application of the invention should be considered. In such a use the T.V. camera is at a remote location, for instance, a security T.V. camera placed high on a lighting pole at the far side of an automobile parking lot used for a once-a-year sporting event. In such a situation running control cables becomes an excessive expense, however, electrical power is already available. The present invention could be mounted on the pole and, after alignment, all operating controls would be transmitted by the secondary laser.

Such a control sequence is initiated at receiver 18 where manual control 62 inputs to digital code generator 44 and, by way of laser 16 transmits its instructions to decoder 54. Decoder 54 then operates motor control 64, which operates motor 66 to turn, focus, or otherwise control camera 32.

Secondary laser 16 is also used to aid in optical alignment of the system and permit such alignment by one operator at one location. This is accomplished by several optional connections at either receiver 18 or transmitter 14. For instance, speaker 68 at receiver 18 can be attached to output amplifier 43 and tone generator 70 at transmitter 14 can be fed into modulator 34 to furnish an operator at receiver 18 an audible tone indication of proper alignment of laser 12 and photodetector 26. Similarly, tone generator 72 at receiver 18 can be fed into amplifier 46 and speaker 74 at transmitter 14 can be connected to amplifier 52 to produce an audio tone for alignment of secondary laser 16 with photodetector 50.

An interesting variation of this approach is the use of loop-thru link 76 at transmitter 14 to connect the output of amplifier 52 to the input of modulator 34. This permits tone generator 72 at receiver 18 to activate speaker 68 at the same location and therefore all mechanical alignment can be adjusted at receiver 18.

Loop-thru link 78 at receiver 18 similarly permits all alignment to take place at transmitter 14. Another aspect of the preferred embodiment is the use of tone and voice generators 70 and 72 and speakers 68 and 74 to communicate between operators during set up of the equipment or, if desired, even during operation.

Loop-thru links 76 and 78 can also be used in actual operation and switched in automatically upon command for use in such applications as computer control.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, light conversion devices other than photodiodes could be used and other control functions such as switching between several signal sources could be accomplished by the secondary laser link. Moreover, other modulation systems can be used for the lasers.

What is claimed as new and desired to be secured by Letters Patent of the United States is:

1. A laser communication system for transmission across an atmospheric link between a radio frequency source and a load comprising:

a primary transmitter including a primary laser, a primary laser modulator connected to the primary laser and to a signal source, and a laser intensity control means connected to the laser for varying the primary laser intensity;

a primary receiver located in the path of a beam from the primary laser and including photodetector means located in the beam path functioning to convert a received laser beam to an electrical signal and a connection to feed the received signal to a load;

a haze comparator circuit connected to the primary photodetector means and comparing the electrical signal from the primary photodetector means to a standard signal to produce an output signal which indicates the sense and degree of the difference between the two;

a secondary laser located at the primary receiver location;

secondary laser modulator circuit providing modulation and intensity control circuit providing power with both circuits connected to the secondary laser;

a secondary laser control circuit connected to the haze comparator circuit and to the secondary laser modulator circuit and converting the output signal from the haze comparator circuit to a form useable to modulate the secondary laser so that the sense and magnitude information from the haze comparator circuit are imposed upon the beam of the secondary laser;

a secondary photodetector, located at the primary transmitter and in the path of a beam from the secondary laser, which converts the light signal to an electrical output signal;

a first control means connected to the secondary photodetector and the primary laser intensity control means and which converts the signal output from the secondary photodetector to a form which varies the primary laser intensity according to the sense and degree of the signal received from the secondary photodetector; and an interconnection between the output of the haze comparator circuit and the secondary laser intensity control circuit so that the intensity of the output of the secondary laser is varied by the haze comparator in the same manner as is the intensity of the output of the primary laser.

2. The laser communication system of claim 1 further including a first loop-thru link interconnecting an output of the secondary photodetector to an input on the primary laser modulator, thereby permitting an electronic signal fed to the secondary laser modulator circuit to be transmitted back to the primary receiver for evaluation.

3. The laser communication system of claim 1 further including a second loop-thru link interconnecting an output of the primary photodetector to an input of the secondary laser modulator circuit, thereby permitting an electronic signal fed to the primary modulator to be transmitted back to the secondary receiver for evaluation.

* * * * *